US012609595B2

(12) United States Patent
Jang et al.

(10) Patent No.: US 12,609,595 B2
(45) Date of Patent: Apr. 21, 2026

(54) AXIAL FLUX MOTOR STRUCTURE USING MAGNETIC LEVITATION FORCE AND ROTATIONAL FORCE

(71) Applicants: HYUNDAI MOTOR COMPANY, Seoul (KR); KIA CORPORATION, Seoul (KR)

(72) Inventors: Hyung Kwan Jang, Uijeongbu-si (KR); Hoo Dam Lee, Seongnam-si (KR); Gyeong Sik Choe, Seoul (KR); Byung Ho Min, Suwon-si (KR); Tae Gyu Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 372 days.

(21) Appl. No.: 18/079,732

(22) Filed: Dec. 12, 2022

(65) Prior Publication Data

US 2023/0412057 A1    Dec. 21, 2023

(30) Foreign Application Priority Data

Jun. 16, 2022    (KR) ........................ 10-2022-0073175

(51) Int. Cl.
  H02K 21/24      (2006.01)
  H02K 7/08       (2006.01)
      (Continued)
(52) U.S. Cl.
  CPC ............. *H02K 21/24* (2013.01); *H02K 7/088* (2013.01); *H02K 7/09* (2013.01); *H02K 21/026* (2013.01)

(58) Field of Classification Search
  CPC .. H02K 1/2798; H02K 1/2793; H02K 1/2796; H02K 1/182; H02K 21/026;
      (Continued)

(56) References Cited

U.S. PATENT DOCUMENTS

2004/0135450 A1*  7/2004  Kanebako .............. H02K 21/22
                                                310/90.5
2009/0072649 A1*  3/2009  Rottmerhusen ........ H02K 29/03
                                                310/156.32

FOREIGN PATENT DOCUMENTS

CN      109067056 A  * 12/2018
GB        2559441 A  *  8/2018  ............. H02K 1/182
      (Continued)

OTHER PUBLICATIONS

Lee et al, Axial Motor including Magnetic Levitation Rotation Body, Jul. 2, 2020, WO 2020138583 (English Machine Translation) (Year: 2020).*
      (Continued)

*Primary Examiner* — Alexander A Singh
(74) *Attorney, Agent, or Firm* — Lempia Summerfield Katz LLC

(57)             ABSTRACT
An axial flux motor structure uses a magnetic levitation force and a rotational force and includes a stator configured so that a coil unit is wound therearound, a permanent magnet unit configured to generate an air gap by generating a repulsive force with the coil unit, and a rotor configured to be fastened to the permanent magnet unit and coupled to a rotary shaft to rotate. A ratio of the number of slots of the stator and the number of poles of the rotor is 3:1.

6 Claims, 2 Drawing Sheets

(51) Int. Cl.
  *H02K 7/09* (2006.01)
  *H02K 21/02* (2006.01)
(58) Field of Classification Search
  CPC ........ H02K 21/24; H02K 16/02; H02K 21/22;
  H02K 7/088; H02K 3/28; H02K 7/09
  USPC ............................. 310/156.32, 49.02, 49.42
  See application file for complete search history.

(56) References Cited

FOREIGN PATENT DOCUMENTS

KR     20150034348 A     4/2015
WO     WO-2020138583 A1 *   7/2020    ............... H02K 1/22

OTHER PUBLICATIONS

Chen et al, Jet Outer Rotor Motor, Dec. 21, 2018, CN 109067056
(English Machine Translation) (Year: 2018).*

* cited by examiner

AXIAL FLUX MOTOR STRUCTURE USING MAGNETIC LEVITATION FORCE AND ROTATIONAL FORCE

CROSS-REFERENCE TO RELATED APPLICATION

This application claims under 35 U.S.C. § 119(a) the benefit of priority to Korean Patent Application No. 10-2022-0073175 filed on Jun. 16, 2022, the entire contents of which are incorporated herein by reference.

BACKGROUND

(a) Technical Field

The present disclosure relates to an axial flux motor structure using a magnetic levitation force and a rotational force. The present disclosure more specifically relates to an axial flux motor structure that is configured so that a ratio of the number of slots of a stator to the number of poles of a rotor satisfies 3:1 by simultaneously generating a magnetic levitation and a rotation magnetic field with only a pole/slot combination without additional configuration.

(b) Background Art

In general, a motor is a power machine that rotates a rotary shaft by electrical interaction between a rotor and a stator. The motor is classified into a radial flux motor and an axial flux motor according to a direction of a magnetic flux.

In the radial flux motor, a rotor is positioned inside a stator and disposed to face the stator with a spacing or gap interposed therebetween in a radial direction orthogonal to an axis. In the axial flux motor, cores of the stator and the rotor are disposed to be spaced apart from each other so that a predetermined spacing or gap is formed in an axial direction. Accordingly, a shaft of a motor is rotated by using an attractive force and a repulsive force generated between a magnetic flux generated in the stator and a magnetic flux of a magnet attached to the rotor.

A pole/slot combination of the radial flux motor and the axial flux motor is calculated as a pole and slot, i.e., pole/slot combination that may generate a rotation magnetic field using a calculation equation considering the rotation magnetic field. However, magnetic levitation may not occur when the calculation equation considering the rotation magnetic field is satisfied.

When a distance of an air gap increases between an opposite surface of the stator and an opposite surface of the magnet in the axial flux motor, an output of the motor is greatly reduced because the distance of the spacing or gap is increased while the magnetic flux flows. In addition, the distance of the air gap is formed with deviation and the distance of the spacing or gap, and when the deviation with the opposite surface of the stator between the magnets and the deviation of the distance of spacing or gap between the magnets increase, a problem arises in that a cogging torque and a torque ripple increase.

In addition, a speed range is considered when designing motors, including motors for electric vehicles. There is a problem in that, as a speed of the motor increases, a back electromotive force increases, and an operation range is limited as the speed range is limited by a voltage limit set value of a control system.

The above information disclosed in this Background section is only to enhance understanding of the background of the disclosure. Accordingly, the Background section may include information that does not form the prior art that is already known to a person of ordinary skill in the art.

SUMMARY OF THE DISCLOSURE

The present disclosure has been made in an effort to solve the above problems. An object of the present disclosure is to provide an axial flux motor structure that is configured so that a ratio of the number of slots of a stator to the number of poles of a rotor satisfies 3:1 by simultaneously generating a magnetic levitation and a rotation magnetic field with only a pole/slot combination without additional configuration.

In addition, another object of the present disclosure is to provide an axial flux motor structure using a magnetic levitation force and a rotational force. Using a magnetic levitation force and a rotational force may reduce the amount of magnetic flux interlinked to a winding of a stator by adjusting a length of an air gap by a magnetic force, thereby reducing a back electromotive force and expanding a speed range.

The objects of the present disclosure are not limited to the above-described objects. Other objects of the present disclosure not mentioned may be understood by the following description and may be more clearly known by embodiments of the present disclosure. In addition, the objects of the present disclosure may be achieved by means described in the claims and a combination thereof.

In order to achieve the objects of the present disclosure, an axial flux motor structure using a magnetic levitation force and a rotational force includes the following configuration.

In one embodiment of the present disclosure, an axial flux motor structure is provided using a magnetic levitation force and a rotational force. The axial flux motor structure includes: a stator configured so that a coil unit is wound therearound; a permanent magnet unit configured to generate an air gap by generating a repulsive force with the coil unit; and a rotor configured to be fastened to the permanent magnet unit and coupled to a rotary shaft to rotate. A ratio of the number of slots of the stator and the number of poles of the rotor is 3:1.

In addition, the coil unit includes a rotation coil configured to generate a rotational force through interaction with the permanent magnet unit to rotate the rotor and a levitation coil configured to levitate the rotor with attractive and repulsive forces according to a vertical position of the stator that interacts with the permanent magnet unit.

In addition, the axial flux motor structure using the magnetic levitation force and the rotational force further includes a bearing unit configured to rotatably couple the rotor to the rotary shaft.

In addition, the bearing unit is configured to support the rotor and maintain the air gap between the stator and the rotor.

In addition, the rotor and stator are configured to be spaced apart from each other at both upper and lower portions of the stator.

The present disclosure may obtain the following effects by the above-described embodiment, and configurations, coupling, and use relationships, which are described below.

According to the present disclosure, it is possible to simultaneously provide the magnetic levitation force and the rotational force even while simultaneously generating the magnetic levitation and the rotation magnetic field with only the pole/slot combination, without configuring the axial flux motor structure, so that the ratio of the number of slots of the stator to the number of poles of the rotor satisfies a ratio of 3:1.

In addition, it is possible to reduce the back electromotive force and expand the speed range limited by the voltage limit setting of the control system for a vehicle by adjusting the length of the air gap by the magnetic force.

The above and other features of the disclosure are discussed below.

BRIEF DESCRIPTION OF THE DRAWINGS

The above and other features of the present disclosure are described in detail with reference to certain examples thereof illustrated in the accompanying drawings, which are given herein below by way of illustration only, and thus are not limitative of the present disclosure, and wherein.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the intended application and use environment.

In the figures, the same reference numbers refer to the same or equivalent sections of the present disclosure throughout the several figures.

DETAILED DESCRIPTION

Hereinafter, embodiments of the present disclosure are described in more detail with reference to accompanying drawings. Embodiments of the present disclosure may be modified in various forms. The scope of the present disclosure should not be construed as being limited to the following embodiments. The various embodiments are provided to more completely describe the present disclosure to those having ordinary skill in the art.

In addition, terms such as " . . . part" and " . . . unit" in the specification mean a unit that processes at least one function or operation, which may be implemented by hardware or a combination of hardware.

In addition, in this specification, when a certain portion is described as being "on" or "above" another portion, this includes not only a case in which the portion is "directly on" another portion but also a case in which other portions are present therebetween. In addition, when a certain portion is described as being "under" or "below" another portion, this includes not only a case in which the portion is "directly under" another portion but also a case in which other portions are present therebetween.

In addition, an "upper end" described in the specification means a direction in which an element moves to the upper end in a height direction on the drawings. Likewise, a "lower end" means a direction in which an element moves to the lower end in the height direction on the drawings.

Figure 1:
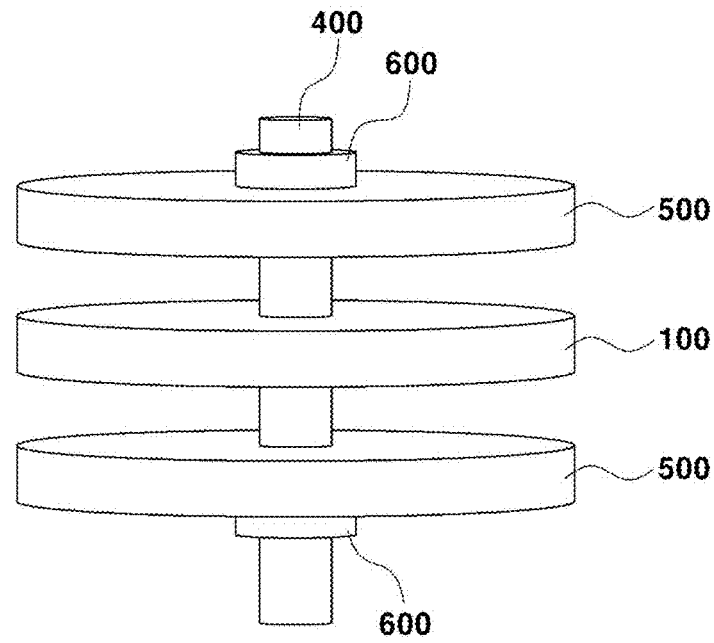
FIG. 1 shows a positional relationship of a rotor and a stator in an axial flux motor structure using a magnetic levitation force and a rotational force according to one embodiment of the present disclosure.
Figure 2:
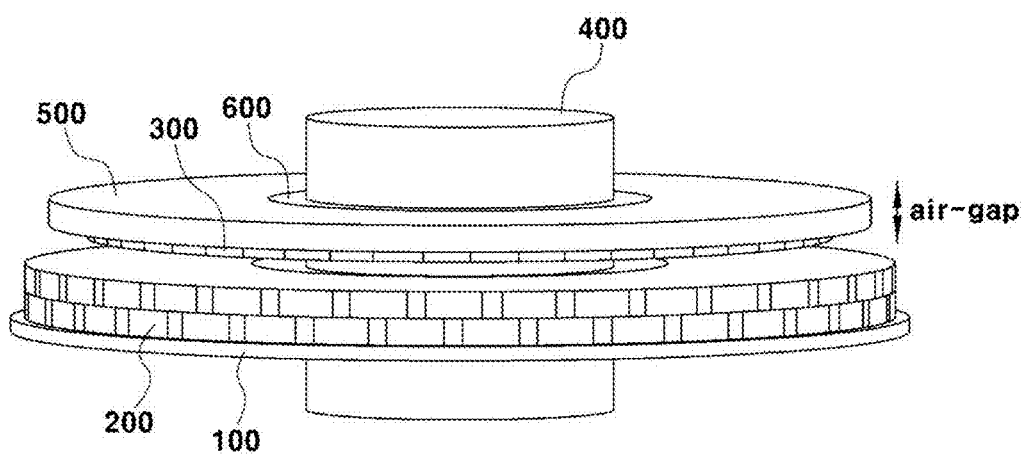
FIG. 2 shows a perspective view of the axial flux motor structure using the magnetic levitation force and the rotational force according to one embodiment of the present disclosure.

FIG. 1 shows a positional relationship of a rotor and a stator in an axial flux motor structure using a magnetic levitation force and a rotational force according to one embodiment of the present disclosure. FIG. 2 shows a perspective view of the axial flux motor structure using the magnetic levitation force and the rotational force according to one embodiment of the present disclosure.

Referring to FIGS. 1 and 2, the axial flux motor structure using the magnetic levitation force and the rotational force according to one embodiment of the present disclosure may be configured to include a stator 100 around which a coil unit 200 is wound and a rotor 500 fastened to a permanent magnet unit 300. The stator 100 may be configured so that the coil unit 200 is wound therearound. The coil unit 200 may be configured to be wound around a slot of the stator 100. The permanent magnet unit 300 may be configured to repel the coil unit 200 to form an air gap. The permanent magnet unit 300 may be configured by alternately magnetizing North (N) poles and South (S) poles. The permanent magnet unit 300 may be configured by using Neodymium (NdFeB), Samarium-Cobalt (SmCo), Ferrite, Alnico magnets, and the like, and the present disclosure is not limited thereto.

The permanent magnet unit 300 may be configured to rotate by a rotation magnetic field generated by the coil unit 200. Since the stator 100 functions as an electromagnet having its own polarity when power is applied to the coil unit 200, the stator 100 may be configured to pull or push the permanent magnet unit 300 with a strong magnetic force when a high voltage is applied to the coil unit 200.

The rotor 500 may be configured to be fastened to the permanent magnet unit 300 and may be integrally coupled to a rotary shaft 400 to rotate. More specifically, the rotor 500 may be configured to have the rotary shaft 400 fixedly coupled to a center to rotate in concert with the rotary shaft 400. The stator 100 may include a plurality of slots so that the coil unit 200 is wound therearound. The coil unit 200 is positioned in the slot. When alternating current (AC) power is applied to the coil unit 200 at an initial start-up, a rotation magnetic field is generated, and an induced current flows in the rotor 500, and the rotor 500 may start to rotate. As shown in FIG. 1, the rotor 500 and stator 100 may be configured to be spaced apart from each other at both upper and lower portions of the stator 100.

The rotor 500 may be fastened to the permanent magnet units 300 arranged at intervals in a circumferential direction. The rotor 500 may be configured to rotate while forming the air gap with the stator 100 at a constant spacing or gap. The rotor 500 may be configured so that a direction of a current flowing through the coil unit 200 is changed to rotate the rotor 500 by a repulsive force or an attraction force generated between the coil unit 200 and the permanent magnet unit 300.

The motor structure according to one embodiment of the present disclosure is configured so that a ratio of the number of slots of the stator 100 to the number of poles of the rotor 500 may be 3:1. For example, the motor structure may be configured to have a combination of 24 poles of the permanent magnet unit 300 of the rotor 500, and 72 slots of the stator 100. The ratio of the number of slots of the stator 100 to the number of poles of the rotor 500 may be a condition for magnetic levitation.

The coil unit 200 may include a rotation coil 210 and a levitation coil 220. The rotation coil 210 may be configured to rotate the rotor 500 by generating a rotational force through interaction with the permanent magnet unit 300. The levitation coil 220 may be configured to magnetically levitate the rotor 500 by generating attractive and repulsive forces according to a vertical position of the stator interacting with the permanent magnet unit 300.

More specifically, the levitation coil 220 may be configured to levitate the rotor 500 by the magnetic repulsive force by generating magnetic fluxes facing each other with the permanent magnet unit 300. When the rotor 500 is positioned under the stator 100, the levitation coil 220 may be configured to support the rotor 500 with a magnetic attraction force through the magnetic flux in the direction opposite to the permanent magnet unit 300. The rotation coil 210 may be configured to generate the rotation magnetic field by interacting with the permanent magnet unit 300 and rotate the rotor 500 by generating a magnetic array torque.

The axial flux motor structure using the magnetic levitation force and the rotational force according to one embodiment of the present disclosure may be configured to further include a bearing unit 600 configured to rotatably couple the rotor 500 to the rotary shaft 400. The bearing unit 600 may be configured to support the rotor 500 while maintaining or adjusting the air gap between the stator 100 and the rotor 500. More specifically, the bearing unit 600 may be configured to support the rotor 500 levitated by the levitation coil 220 to maintain the air gap between the stator 100 and the rotor 500. Moreover, the bearing unit 600 may be configured so that each rotor 500 may be positioned on the rotary shaft 400 to adjust the size of the air gap between the stator 100 and the rotor 500.

In one embodiment, the coil unit 200 may be made of a copper or aluminum material. The stator 100 and the rotor 500 may be a magnetic or non-magnetic substance. The stator 100 and the rotor 500 may be made of a silicon steel sheet or iron in the case of the magnetic substance, or made of stainless steel, epoxy, or plastic in the case of the non-magnetic substance. However, these materials are just examples of suitable materials and thus are not intended to be limiting.

Figure 3:
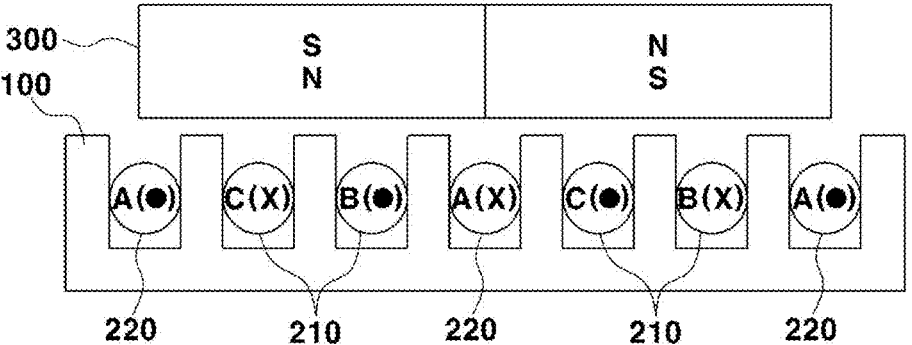
FIG. 3 shows a cross-sectional view of a single-floor winding structure as a structure of the stator in the axial flux motor structure using the magnetic levitation force and the rotational force according to one embodiment of the present disclosure.
Figure 4:
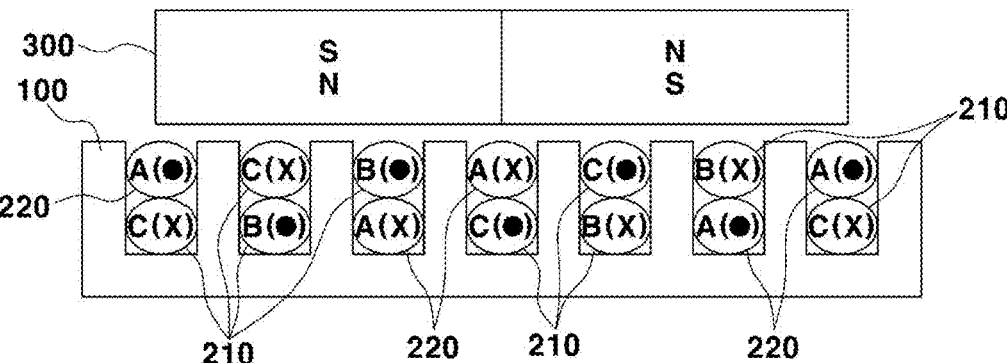
FIG. 4 shows a cross-sectional view of a double-floor winding structure as a structure of a stator in an axial flux motor structure using a magnetic levitation force and a rotational force according to another embodiment of the present disclosure.

FIG. 3 shows a cross-sectional view of a single-floor or single-level winding structure as a structure of the stator 100 in the axial flux motor structure using the magnetic levitation force and the rotational force according to one embodiment of the present disclosure. FIG. 4 shows a cross-sectional view of a double-floor or double level winding structure as a structure of a stator 100 in an axial flux motor structure using a magnetic levitation force and a rotational force according to another embodiment of the present disclosure.

Referring to FIGS. 3 and 4, the stator 100 may be formed in a centralized winding or a distributed winding according to a winding method of the coil unit 200 and may be formed in a single-level winding or double-level winding structure. As an example, FIG. 3 shows six slots corresponding to two poles in a 24-pole/72-slot structure as the structure of the single-level winding stator 100. As another example, FIG. 4 shows six slots corresponding to two poles in the 24-pole/72-slot structure as the structure of the double-level winding stator 100.

The rotation coil 210 may correspond to a b-phase coil and a c-phase coil in FIGS. 3 and 4, and the rotation magnetic field may be generated by the rotation coil 210. The levitation coil 220 corresponds to an a-phase coil in FIGS. 3 and 4, and a force for magnetic levitation may be generated by the levitation coil 220. As shown in FIG. 3, the a-phase coil may be wound to enter slot 1 and exit slot 4. The b-phase coil may be wound to enter slot 3 and exit slot 6. The c-phase coil may be wound to enter slot 2 and exit slot 5.

In another example, as shown in FIG. 4, the a-phase coil may be wound to enter slot 1 of an upper second level or floor and exit slot 4 of an upper first level or floor. The b-phase coil may be wound to enter slot 2 on the first level or floor and exit slot 5 on the first level or floor. The c-phase coil may be wound to exit slot 2 on the second level or floor and enter slot 5 on the second level or floor.

The coil unit 200 may be configured to be wound only in a transverse direction of one level or floor other than a diagonal direction in the stator 100 having the double-level winding structure. Accordingly, a cross section of the coil unit 200 facing the permanent magnet unit 300 may be configured to have a flat structure.

In summary, the present disclosure provides the axial flux motor structure using the magnetic levitation force and the rotational force. The disclosed axial flux motor structure may improve the magnetic levitation force and the rotational force even while simultaneously generating the magnetic levitation and the rotation magnetic field with only the pole/slot combination, without additional configuration, by configuring the axial flux motor so that the ratio of the number of slots of the stator 100 to the number of poles of the rotor 500 is 3:1.

The above detailed description is illustrative of the present disclosure and shows and describes embodiments of the present disclosure. The present disclosure may be used in various other combinations, modifications, and environments. In other words, changes or modifications are possible within the scope of the technical concept of the embodiments disclosed in this specification, the scope equivalent to the described embodiments, and/or the scope of techniques or knowledge in the art. The specification describes a mode for implementing the technical spirit of the present disclosure. Various changes required in specific applications and uses of the present disclosure are also possible. Accordingly, the above detailed description of the present disclosure is not intended to limit the present disclosure to the disclosed embodiments. In addition, the appended claims should also be construed to include other embodiments.

What is claimed is:

1. An axial flux motor structure using a magnetic levitation force and a rotational force, the axial flux motor structure comprising:

a stator configured so that a coil unit is wound therearound;

a permanent magnet unit configured to generate an air gap by generating a repulsive force with the coil unit;

a rotor configured to be fastened to the permanent magnet unit and coupled to a rotary shaft to rotate; and a bearing unit configured to rotatably couple the rotor to the rotary shaft and support the rotor, wherein a ratio of the number of slots of the stator and the number of poles of the rotor satisfies 3:1, wherein the coil unit includes:

a rotation coil configured to generate a rotational force through interaction with the permanent magnet unit to rotate the rotor; and a levitation coil configured to levitate the rotor with attractive and repulsive forces according to a vertical position of the stator that interacts with the permanent magnet unit, and wherein the rotation coil and the levitation coil are located in a same level of the number of slots of the stator.

2. The axial flux motor structure of claim 1, wherein the bearing unit is configured to maintain the air gap between the stator and the rotor.

3. The axial flux motor structure of claim 1, wherein the rotor and stator are configured to be spaced apart from each other at both upper and lower portions of the stator.

4. The axial flux motor structure of claim 1, wherein the bearing unit is configured such that each rotor is positioned on the rotary shaft to adjust a size of the air gap between the stator and the rotor.

5. The axial flux motor structure of claim 1, wherein the bearing unit is configured to support the rotor levitated by the levitation coil to maintain the air gap between the stator and the rotor.

6. The axial flux motor structure of claim 1, wherein the rotation coil and the levitation coil are alternatively positioned on a first side of the stator.

\* \* \* \* \*